(12) United States Patent
Lee et al.

(10) Patent No.: US 8,583,063 B1
(45) Date of Patent: Nov. 12, 2013

(54) ANTENNA CONFIGURATION SELECTION BY A WIRELESS COMMUNICATION DEVICE

(75) Inventors: Woo Jae Lee, Manhattan, KS (US); Hannah Jo Sifuentes, Raytown, MO (US); Trevor Daniel Shipley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 894 days.

(21) Appl. No.: 12/752,631

(22) Filed: Apr. 1, 2010

(51) Int. Cl.
 *H04B 1/04* (2006.01)
 *H04M 1/00* (2006.01)

(52) U.S. Cl.
 USPC .................. 455/129; 455/566; 455/575.7

(58) Field of Classification Search
 USPC ........ 455/129, 566, 575.7, 550.1, 556.1, 557, 455/562.1, 575.1, 97, 128, 349, 90.3
 See application file for complete search history.

(56) References Cited

U.S. PATENT DOCUMENTS

| | | | |
|---|---|---|---|
| 5,628,055 A | 5/1997 | Stein | |
| 5,657,028 A | 8/1997 | Sanad | |
| 5,867,131 A | 2/1999 | Camp, Jr. et al. | |
| 6,028,555 A | 2/2000 | Harano | |
| 6,181,283 B1 | 1/2001 | Johnson et al. | |
| 6,244,894 B1 | 6/2001 | Miyashita | |
| 6,259,409 B1 | 7/2001 | Fulton et al. | |
| 6,285,328 B1 * | 9/2001 | Masaki et al. | 343/702 |
| 6,295,031 B1 | 9/2001 | Wallace et al. | |
| 6,445,297 B1 | 9/2002 | Nicholson | |
| 6,522,299 B2 | 2/2003 | Beard et al. | |
| 6,556,170 B2 | 4/2003 | Northey | |
| 6,574,112 B2 | 6/2003 | Washino et al. | |
| 6,667,719 B2 | 12/2003 | LaKomski | |
| 6,670,926 B2 | 12/2003 | Miyasaka | |
| 6,686,887 B2 | 2/2004 | Kasuya et al. | |
| 6,871,079 B1 | 3/2005 | Choi et al. | |
| 6,924,770 B2 | 8/2005 | Carpenter et al. | |
| 6,959,209 B2 * | 10/2005 | Fang | 455/571 |
| 7,023,389 B2 | 4/2006 | Demicco et al. | |
| 7,043,209 B2 * | 5/2006 | Hirota | 455/101 |
| 7,069,043 B2 * | 6/2006 | Sawamura et al. | 455/550.1 |
| 7,123,204 B2 | 10/2006 | Forster et al. | |
| 7,202,825 B2 | 4/2007 | Leizerovich et al. | |
| 7,262,735 B2 | 8/2007 | Noe | |
| 7,295,171 B2 | 11/2007 | Caesar | |
| 7,312,759 B2 | 12/2007 | Kinney et al. | |
| 7,639,190 B2 * | 12/2009 | Shimasaki et al. | 343/702 |
| 7,778,678 B2 * | 8/2010 | Kitamura et al. | 455/575.8 |
| 7,912,434 B2 * | 3/2011 | Kimoto et al. | 455/272 |
| 8,212,728 B2 * | 7/2012 | Ide | 455/575.7 |
| 2001/0009507 A1 | 7/2001 | Washino et al. | |
| 2002/0140614 A1 | 10/2002 | Northey | |
| 2002/0163472 A1 | 11/2002 | Kasuya et al. | |
| 2003/0080906 A1 | 5/2003 | Miyasaka | |
| 2003/0128165 A1 | 7/2003 | LaKomski | |
| 2004/0036657 A1 | 2/2004 | Forster et al. | |
| 2005/0079820 A1 | 4/2005 | Yamashita | |
| 2005/0119029 A1 | 6/2005 | Kinney et al. | |

(Continued)

*Primary Examiner* — Pablo Tran

(57) ABSTRACT

A wireless communication device comprises an antenna interface, a user interface, and a processing system. The antenna interface is configured to physically connect to an antenna mounting unit. The user interface is configured to receive wireless communication usage information from a user. The processing system is configured to process the wireless communication usage information to select one of a plurality of antenna configurations. The user interface is configured to display an image of the selected antenna configuration installed on the antenna mounting unit.

20 Claims, 7 Drawing Sheets

(56) References Cited

U.S. PATENT DOCUMENTS

| | | |
|---|---|---|
| 2005/0197169 A1 | 9/2005 | Son |
| 2006/0114160 A1 | 6/2006 | Noe |
| 2006/0290583 A1 | 12/2006 | Forster et al. |
| 2007/0057851 A1 | 3/2007 | Leizerovich et al. |
| 2007/0080871 A1 | 4/2007 | Ying |
| 2008/0076468 A1 | 3/2008 | Kinney et al. |
| 2009/0068556 A1 | 3/2009 | Jacobs et al. |
| 2009/0256766 A1 | 10/2009 | Bury |
| 2012/0244895 A1* | 9/2012 | Thomas et al. ............... 455/500 |

* cited by examiner

US 8,583,063 B1

ANTENNA CONFIGURATION SELECTION BY A WIRELESS COMMUNICATION DEVICE

TECHNICAL BACKGROUND

Wireless communication devices typically utilize wireless communication networks to communicate with further communication networks and equipment. Individuals have become increasingly reliant on wireless communication devices to send and receive information. For example, an individual may utilize a wireless communication device for voice communications, research, business, and entertainment. In addition to voice calls and data transfers, some wireless communication devices comprise additional radio frequency (RF) communication capabilities, such as radar detection, digital television, and AM/FM radio reception.

In order to provide its various RF communication capabilities, a wireless communication device is equipped with an antenna. The antenna supplied with the wireless communication device is typically designed to work adequately for all of the RF communication capabilities of the device. However, each of the RF communication capabilities have different physical constraints and operate in different radio frequencies of the RF spectrum. Thus, the manufacturer of a wireless communication device typically compromises when designing an antenna for the device in order to provide acceptable performance for all of the RF communication capabilities of the wireless communication device.

OVERVIEW

A wireless communication device comprises an antenna interface, a user interface, and a processing system. The antenna interface is configured to physically connect to an antenna mounting unit. The user interface is configured to receive wireless communication usage information from a user. The processing system is configured to process the wireless communication usage information to select one of a plurality of antenna configurations. The user interface is configured to display an image of the selected antenna configuration installed on the antenna mounting unit.

DETAILED DESCRIPTION

The following description and associated drawings teach the best mode of the invention. For the purpose of teaching inventive principles, some conventional aspects of the best mode may be simplified or omitted. The following claims specify the scope of the invention. Some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
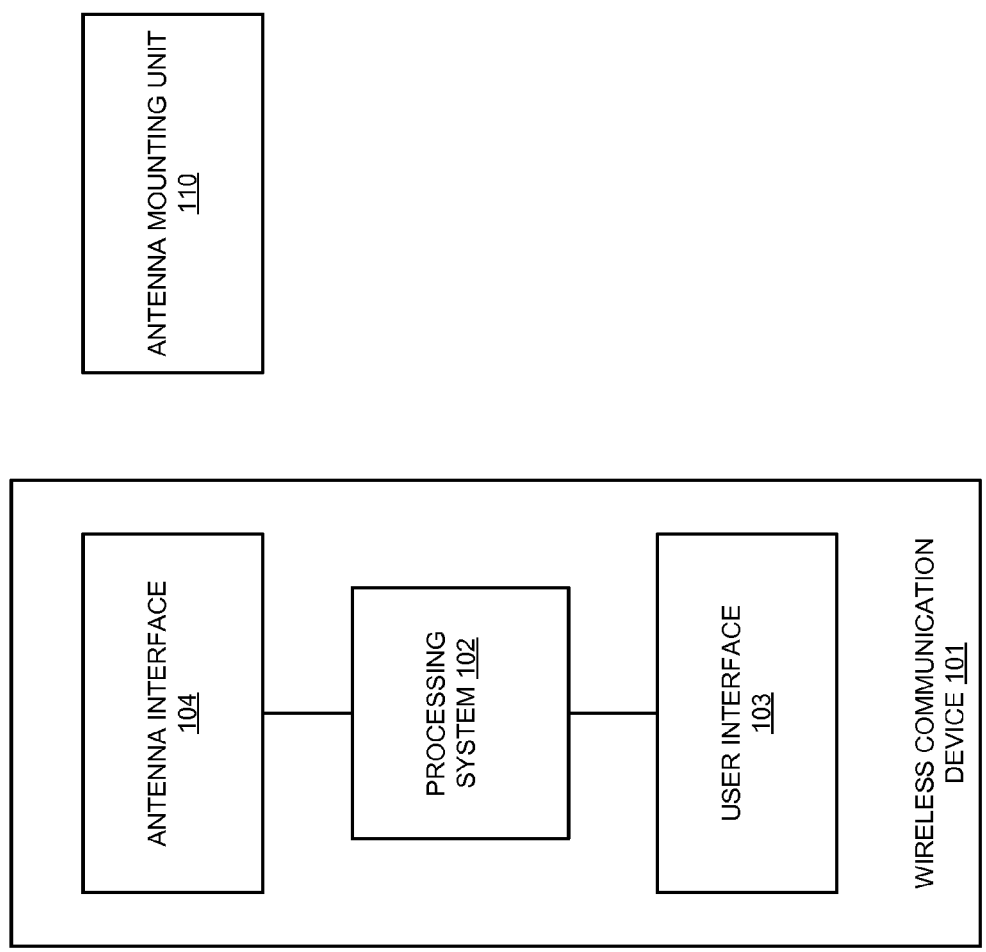
FIG. 1 is a block diagram that illustrates a communication system.

FIG. 1 is a block diagram that illustrates communication system 100. Communication system 100 includes wireless communication device 101 and antenna mounting unit 110. Wireless communication device 101 includes processing system 102, user interface 103, and antenna interface 104. Processing system 102 is linked to antenna interface 104 and user interface 103. Antenna interface 104 is configured to physically connect to antenna mounting unit 110.

Figure 2:
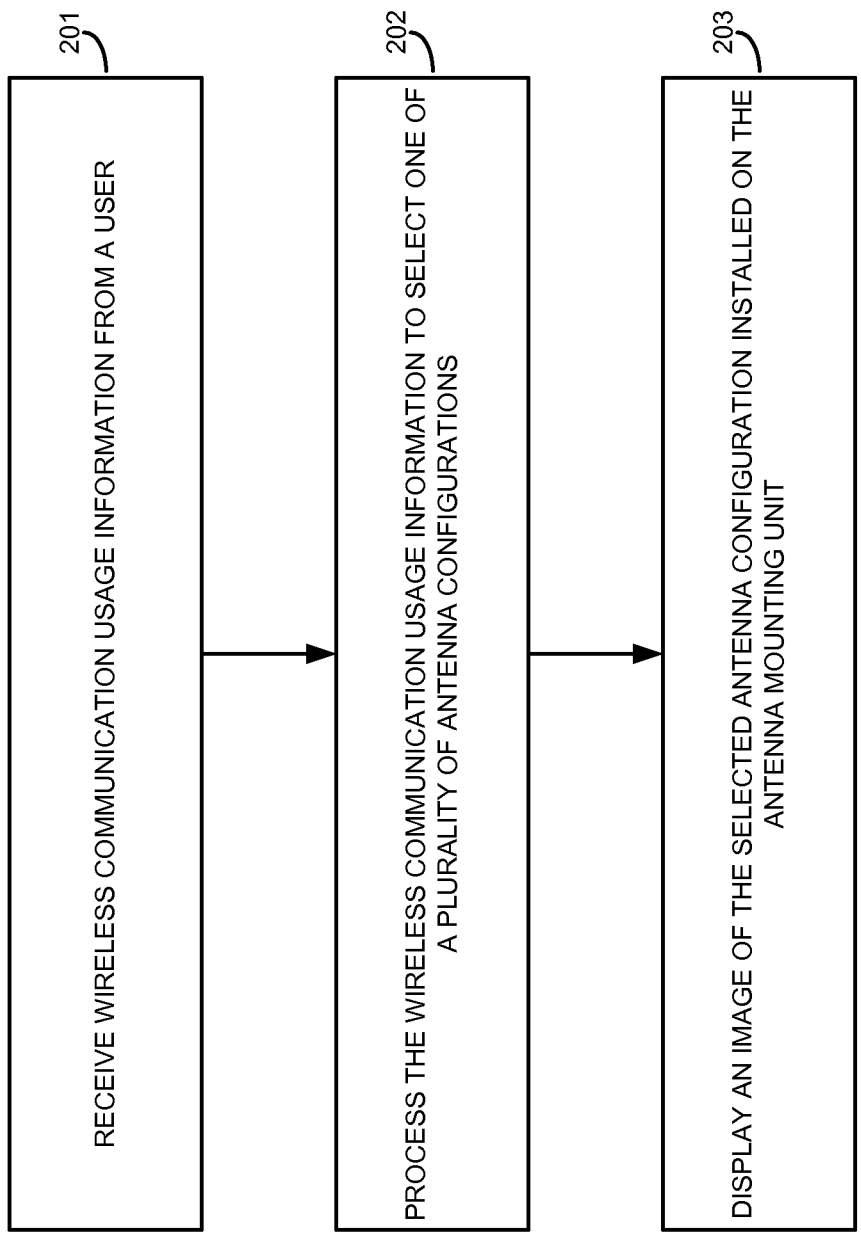
FIG. 2 is a flow diagram that illustrates an operation of a wireless communication device in the communication system.

FIG. 2 is a flow diagram that illustrates an operation of wireless communication device 101 in communication system 100. The steps of the operation are indicated below parenthetically. In FIG. 2, wireless communication device 101 receives wireless communication usage information from a user (201). Typically, the wireless communication usage information is provided by the user through user interface 103, although the user may provide the usage information through a communication interface in some examples. The wireless communication usage information could comprise any wireless communication capabilities of wireless communication device 101 that a user of device 101 desires to use. For example, wireless communication device 101 may be capable of communicating with a communication network in various wireless communication protocols to provide voice and data services for the user, and could comprise additional abilities such as digital television reception, radar detection, and audio reception using amplitude modulation (AM) radio, frequency modulation (FM) radio, or digital audio broadcasts. Thus, the wireless communication usage information could comprise an amount that the user desires to utilize each of the various wireless communication capabilities of wireless communication device 101.

In some examples, user interface 103 is configured to receive the wireless communication usage information as a selection of a plurality of radio frequency (RF) technologies from a user of device 101. For example, user interface 103 may be configured to display the RF technologies that wireless communication device 101 is capable of performing and receive a selection of those RF technologies as the wireless communication usage information from the user. In some examples, user interface 103 is configured to receive a percentage of usage for each of the selected RF technologies from the user.

Wireless communication device 101 processes the wireless communication usage information to select one of a plurality of antenna configurations (202). For example, wireless communication device 101 could have predetermined antenna configurations stored in a memory device. In other examples, wireless communication device 101 may access the antenna configurations from a remote server over a communication network. The antenna configurations could comprise various antenna designs which are configured to enhance transmission and/or reception of one or more of the various wireless communication capabilities of wireless communication device 101. In some examples, wireless communication device 101 could select one of the antenna configurations by matching the wireless communication usage information to one of the antenna configurations. For example, wireless communication device 101 may have information regarding which of its wireless capabilities are enhanced by each antenna configuration, and device 101 could select the antenna configuration that best matches the wireless communication usage information provided by the user.

Once an antenna configuration is selected, wireless communication device 101 displays an image of the selected antenna configuration installed on an antenna mounting unit 110 (203). The image of the selected antenna configuration installed on antenna mounting unit 110 enables the user to visually identify the selected antenna configuration as it would appear when installed on antenna mounting unit 110. In some examples, user interface 103 is configured to display an identification code of the selected antenna configuration installed on the antenna mounting unit 110. For example, the identification code could comprise a model number of a pre-fabricated antenna mounting unit 110 comprising the selected antenna configuration which enables the user to quickly select the appropriate antenna mounting unit 110 to connect to antenna interface 104. In some examples, user interface 103 is configured to display an image of an actual size of the selected antenna configuration installed on the antenna mounting unit 110. In this case, the user of device 101 may use a blank antenna mounting unit 110 and install the selected antenna configuration on antenna mounting unit 110 by referencing the image of the actual size of the selected antenna configuration installed on the antenna mounting unit 110.

Advantageously, a user of wireless communication device 101 may provide wireless communication usage information and receive an image of a selected antenna configuration installed on antenna mounting unit 110. In this manner, the user can identify the optimal antenna configuration for the user's intended wireless communication usage. By utilizing a customized selection of an antenna configuration, the operation of wireless communication device 101 will be enhanced with respect to the desired usage of device 101 as provided by the user in the wireless communication usage information.

Referring back to FIG. 1, wireless communication device 101 may comprise any device having wireless communication capabilities. For example, wireless communication device 101 could comprise a telephone, transceiver, mobile phone, cellular phone, smartphone, computer, personal digital assistant (PDA), e-book, game console, mobile Internet device, wireless network interface card, media player, or some other wireless communication apparatus—including combinations thereof. Wireless network protocols that may be utilized by wireless communication device 101 include Code Division Multiple Access (CDMA) 1xRTT, Global System for Mobile communications (GSM), Universal Mobile Telecommunications System (UMTS), High-Speed Packet Access (HSPA), Evolution-Data Optimized (EV-DO), EV-DO rev. A, Third Generation Partnership Project Long Term Evolution (3GPP LTE), Worldwide Interoperability for Microwave Access (WiMAX), IEEE 802.11 protocols (Wi-Fi), Bluetooth, Internet, telephony, or any other wireless network protocol that facilitates communication between wireless communication device 101 and a communication network. In addition, wireless communication device 101 could comprise additional RF technology capabilities such as digital television reception, satellite navigation, radar detection, audio reception using either analog AM/FM radio or digital audio broadcasts via land or satellite, push-to-talk, two-way radio (walkie-talkie), radio control (RC) transmission to control various objects such as model cars and airplanes, and control of motor vehicles with RF-based remote keyless entry or remote start systems.

As noted above, wireless communication device 101 comprises processing system 102, user interface 103, and antenna interface 104. Processing system 102 typically comprises processing circuitry such as a microprocessor and other circuitry that retrieves and executes operating software from a memory device. User interface 103 comprises components that interact with a user to receive user inputs and to present media and/or information. For example, user interface 103 may include a speaker, microphone, buttons, lights, display screen, touch screen, touch pad, scroll wheel, communication port, or some other user input/output apparatus—including combinations thereof.

Antenna interface 104 is configured to connect to antenna mounting unit 110. When antenna mounting unit 110 is connected to antenna interface 104, antenna interface 104 enables wireless communication device 101 to utilize the antenna portion of antenna mounting unit 110 for the transmission and reception of RF technologies. In addition to or as part of antenna interface 104, wireless communication device 101 may comprise a wireless communication interface comprising RF communication circuitry. The RF communication circuitry typically includes an amplifier, filter, RF modulator, and signal processing circuitry.

Antenna mounting unit 110 comprises an electrically insulated substrate and electrically conductive contacts configured to connect to antenna interface 104. For example, the substrate could comprise dielectric materials such as plastic, glass, cotton paper, or epoxy, and the conductive contacts could comprise metal such as copper, gold, or silver. In some examples, antenna mounting unit 110 comprises a printed circuit board (PCB). Also, in some examples, the substrate of antenna mounting unit 110 may comprise additional conductive material arranged in an antenna configuration and connected to the contacts. In other examples, the substrate of antenna mounting unit 110 does not comprise any conductive material other than the electrically conductive contacts configured to connect to antenna interface 104. In this case, a user may manually supply an antenna configuration using copper foil tape or some other electrically conductive material in order to install an antenna configuration upon antenna mounting unit 110.

Figure 3:
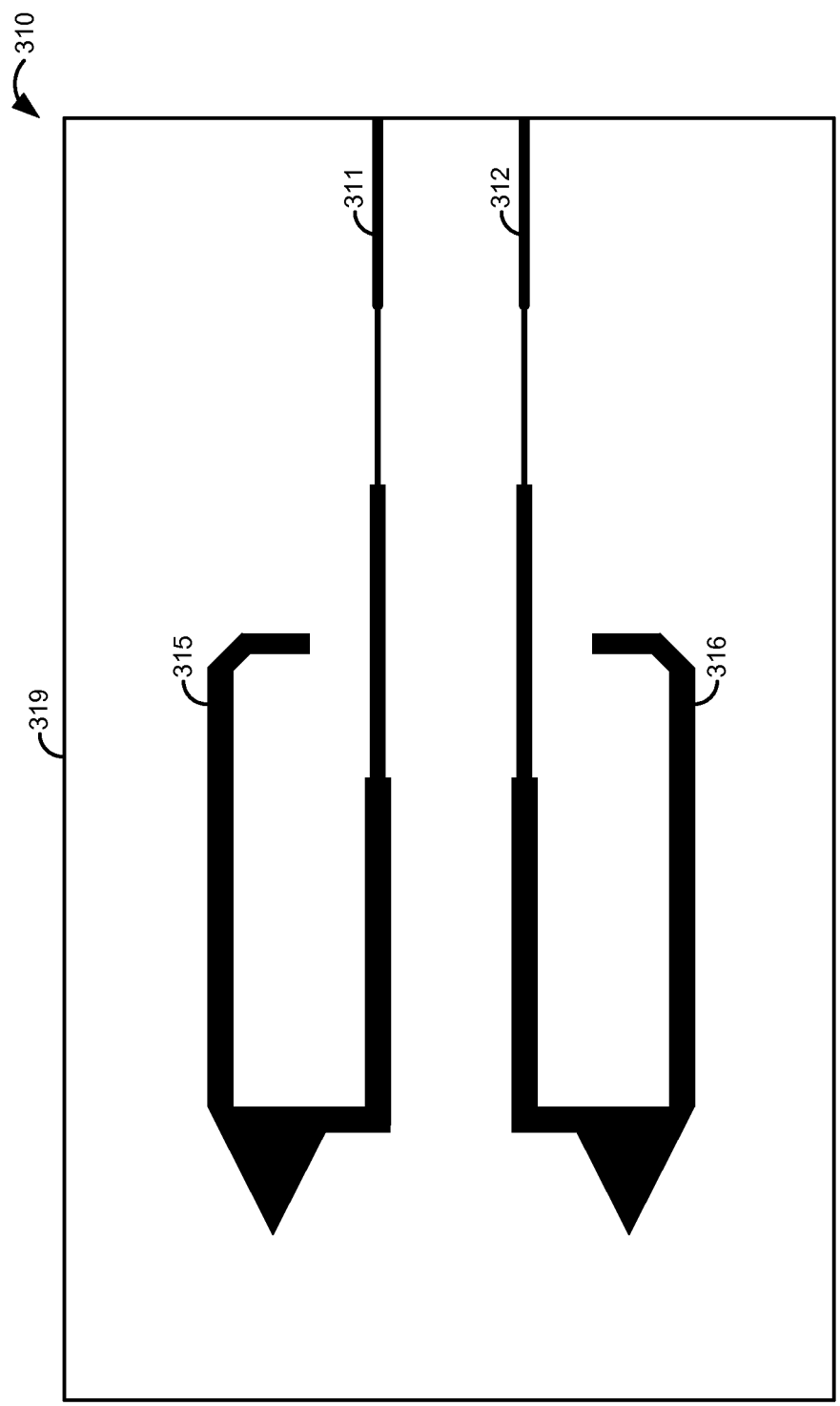
FIG. 3 is a block diagram that illustrates an antenna mounting unit.

FIG. 3 is a block diagram that illustrates antenna mounting unit 310. Antenna mounting unit 310 provides an example of antenna mounting unit 110, although mounting unit 110 could use alternative configurations. Antenna mounting unit 310 comprises a pre-etched PCB comprising dielectric substrate 319, antenna traces 315 and 316, and contacts 311 and 312. The contacts 311-312 and antenna traces 315-316 comprise copper foil etched into the surface of the PCB in the pattern shown in FIG. 3. Contacts 311-312 comprise a lead connection and a ground connection for antenna mounting unit 310. Contacts 311-312 are configured to connect to an antenna interface of a wireless communication device.

The antenna configuration represented by antenna traces 315 and 316 is custom-designed for a particular usage, or combination of usages, of a wireless communication device. For example, the particular antenna configuration shown installed on antenna mounting unit 310 could comprise an antenna that is "tuned" or optimized for both Wi-Fi and WiMAX signals. Thus, a user of a wireless communication device could connect antenna mounting unit 310 to an antenna interface when the user intends to primarily utilize the wireless communication device for Wi-Fi and WiMAX data transfers. By obtaining or creating additional antenna mounting units comprising different antenna configurations from the one shown installed on unit 310, the user could employ these different mounting units with the wireless communication device to optimally configure the device for different wireless communication uses of the device. In this manner, antenna mounting unit 310 provides a modular antenna for a wireless communication device with an antenna interface, enabling the user to switch out different antenna configurations based on the intended usage of the wireless communication device.

Figure 4:
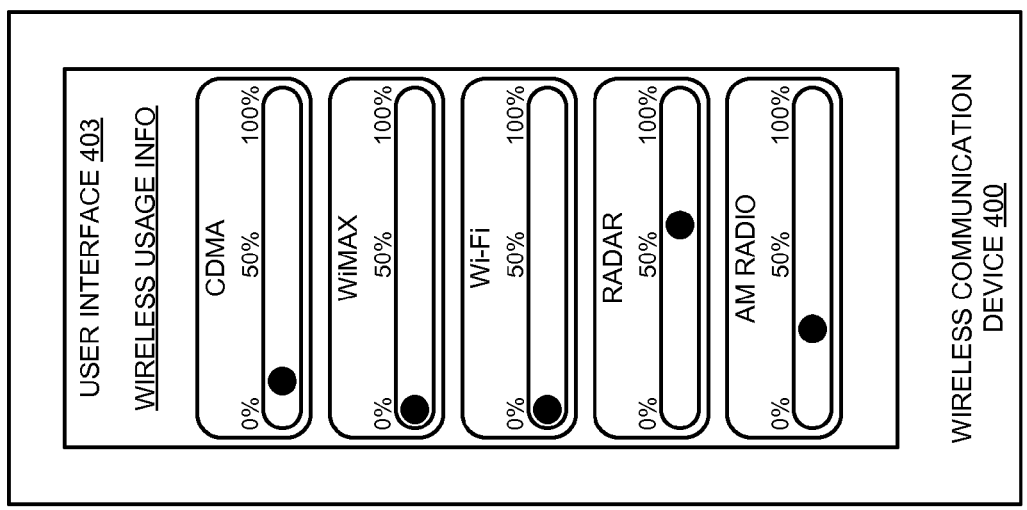
FIG. 4 is a block diagram that illustrates exemplary wireless usage options on a user interface of a wireless communication device.

FIG. 4 is a block diagram that illustrates exemplary wireless usage options on user interface 403 of wireless communication device 400. The wireless usage options displayed on user interface 403 allow a user of wireless communication device 400 to enter custom wireless usage information. Note that the wireless usage options presented on user interface 403 are exemplary, and greater or fewer options may be available to a user of wireless communication device 400 and may be displayed in different formats. For example, instead of percentages, the user could rank the wireless usage options in order of priority from most desired to least desired.

In FIG. 4, user interface 403 displays options for RF technologies which wireless communication device 400 is capable of performing. In this case, the RF technologies shown are CDMA, WiMAX, Wi-Fi, radar, and AM radio. The wireless usage information for each RF technology may be selected by the user by positioning the corresponding black dots to the user's desired selections on a scale of 0% to 100%. In this example, a user has selected roughly 10% for CDMA, 0% for WiMAX and Wi-Fi, 60% for radar, and 30% for AM radio. The user may have selected these percentages with the intent to travel by car, and thus does not require an antenna optimized for high speed data transfers using WiMAX or Wi-Fi, but does want to optimize the antenna for radar detection with good AM radio reception while retaining the ability to receive CDMA voice calls.

Once the user sets the wireless usage information, wireless communication device 400 processes the usage information to select an antenna configuration that best matches the desired usage. In this example, wireless communication device 400 selects from various predetermined antenna configurations to select an antenna configuration that most closely matches the user's desired 60% radar, 30% AM radio, and 10% CDMA selections. Once the antenna configuration is selected, wireless communication device 400 displays an image of the selected antenna configuration on user interface 403. In this manner, the user can easily identify the selected antenna configuration from among various pre-manufactured antenna mounting units, or the user may create the antenna configuration by copying the antenna pattern onto a blank antenna mounting unit. An example of an antenna configuration as displayed by a wireless communication device is shown next in FIG. 5.

Figure 5:
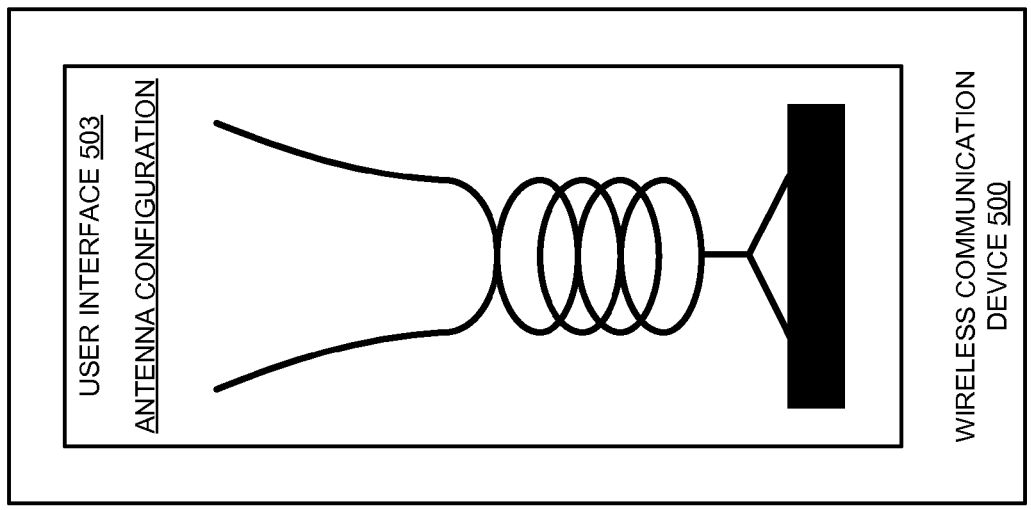
FIG. 5 is a block diagram that illustrates an exemplary antenna configuration displayed on a user interface of a wireless communication device.

FIG. 5 is a block diagram that illustrates an exemplary antenna configuration displayed on user interface 503 of wireless communication device 500. User interface 503 displays the antenna configuration in response to receiving wireless communication usage information from a user and processing the information to select the antenna configuration. Thus, the antenna configuration shown on user interface 503 is custom designed for a particular usage, or combination of usages, by a user of wireless communication device 500. For example, the particular antenna configuration shown on user interface 503 could comprise an antenna that is optimized for satellite navigation and digital television reception.

Based on the image of the antenna configuration, a user of a wireless communication device 500 could locate a prefabricated antenna mounting unit having this antenna configuration installed thereon. However, in this example, the antenna configuration displayed on user interface 503 is also the actual size of the antenna configuration installed on an antenna mounting unit. Thus, the user could alternatively create this antenna configuration using a blank antenna mounting unit and copper foil tape. Advantageously, in order to create the antenna, the user would arrange the copper foil tape on the antenna mounting unit in the same size and configuration as displayed on user interface 503. The user could then connect the antenna mounting unit to an antenna interface of wireless communication device 500, thereby enabling device 500 to utilize the custom antenna configuration suited for the user's current wireless communication usage requirements.

Figure 6B:
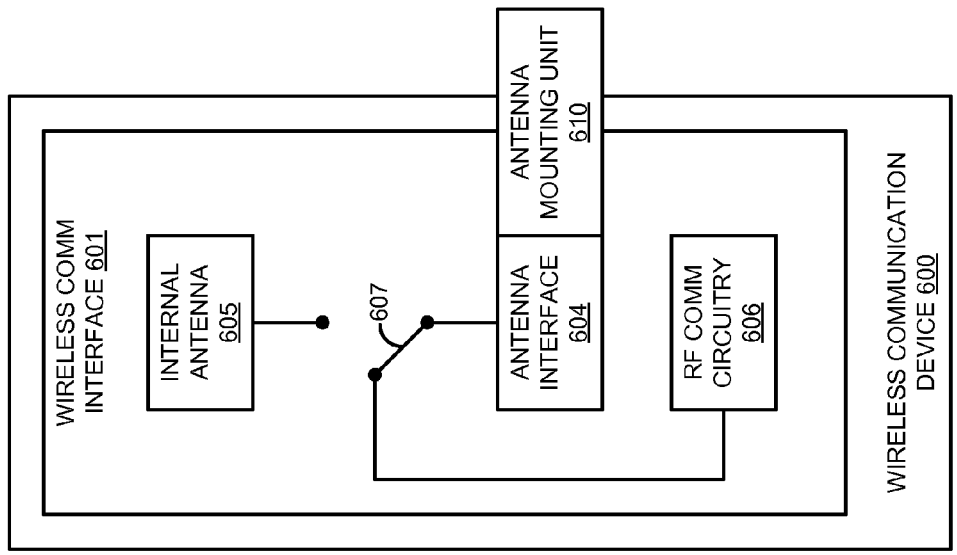
FIGS. 6A and 6B are block diagrams that illustrate a wireless communication device in an exemplary embodiment.
Figure 6A:
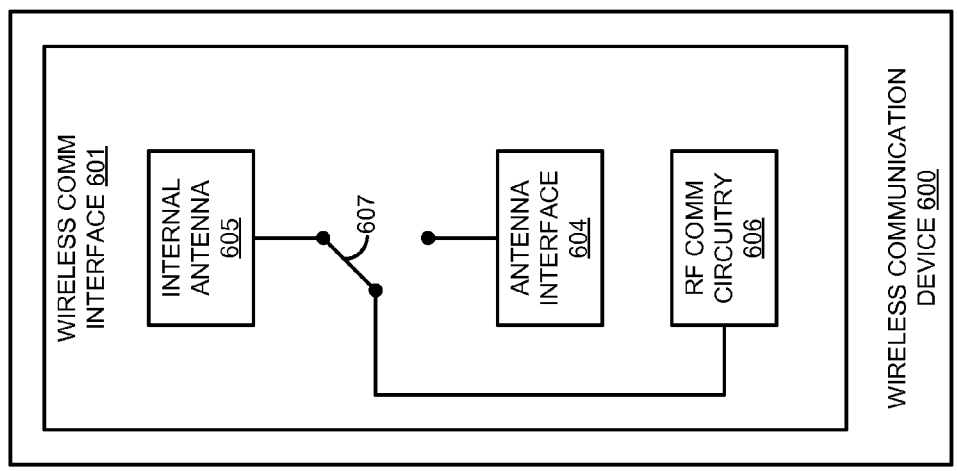

FIGS. 6A and 6B are block diagrams that illustrate wireless communication device 600 in an exemplary embodiment. Wireless communication device 600 comprises wireless communication interface 601. Wireless communication interface 601 comprises antenna interface 604, internal antenna 605, RF communication circuitry 606, and switch 607. Antenna interface 604 is configured to physically connect to antenna mounting unit 610. Switch 607 is positioned between antenna interface 604 and internal antenna 605.

In FIG. 6A, switch 607 is connecting internal antenna 605 to RF communication circuitry 606. Since antenna mounting unit 610 is not connected to antenna interface 604 in FIG. 6A, wireless communication device 600 is utilizing the internal antenna 605 to provide reception and/or transmission of wireless communication signals. In other words, switch 607 is configured to connect to internal antenna 605 by default unless antenna mounting unit 610 is physically connected to antenna interface 604. Note that although wireless communication device 500 is shown with internal antenna 605, other examples could include an external antenna interface in addition to or instead of internal antenna 605. For example, wireless communication device 600 could utilize antenna mounting unit 610 connected to antenna interface 604 as a primary antenna by default, and switch 607 could switch to an external antenna interface when a user connects an external antenna to the external antenna interface.

FIG. 6B shows antenna mounting unit 610 physically connected to antenna interface 604. In FIG. 6B, switch 607 is connecting antenna interface 604 to RF communication circuitry 606. Since antenna mounting unit 610 is connected to antenna interface 604, wireless communication device 600 is utilizing antenna mounting unit 610 to send and receive wireless communication signals. Switch 607 disconnects from internal antenna 605 when the user connects antenna mounting unit 610 to antenna interface 604. In some examples, switch 607 could comprise a sensor element which senses when antenna mounting unit 610 is connected to antenna interface 604. The sensor could comprise an electrical sensor, optical sensor, magnetic sensor, or some other technique of sensing that antenna mounting unit 610 is physically connected to antenna interface 604. Advantageously, when switch 607 switches to antenna interface 604, internal antenna 605 is disconnected from RF communication circuitry 606, thereby preventing additional wireless signals received by internal antenna 605 from interfering with the customized antenna configuration installed on antenna mounting unit 610.

Figure 7:
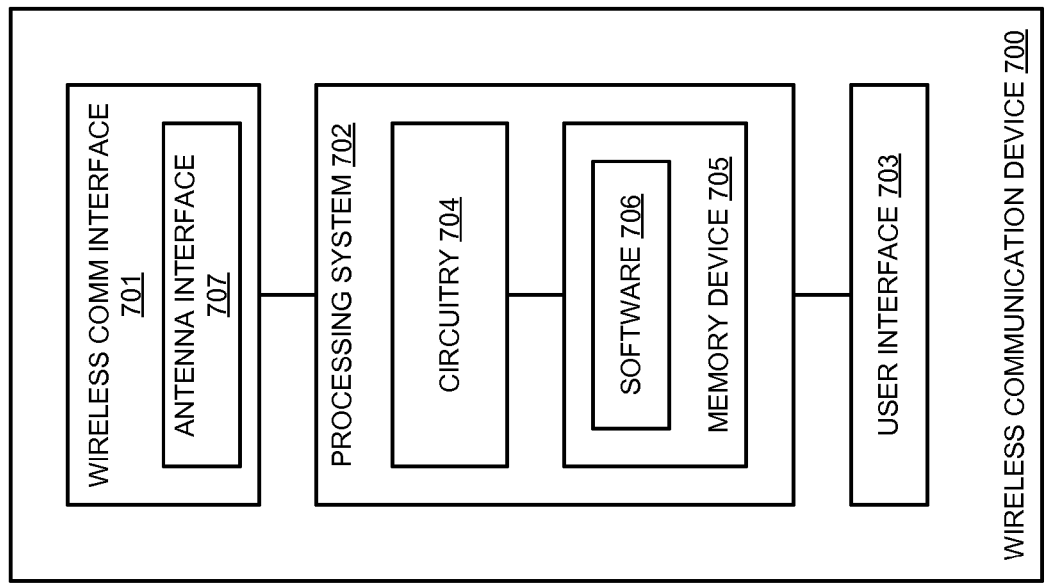
FIG. 7 is a block diagram that illustrates a wireless communication device.

FIG. 7 is a block diagram that illustrates wireless communication device 700. Wireless communication device 700 provides an example of wireless communication devices 101, 400, 500, and 600, although devices 101, 400, 500, and 600 could use alternative configurations. Wireless communication device 700 comprises wireless communication interface 701, processing system 702, and user interface 703. Processing system 702 is linked to wireless communication interface 701 and user interface 703. Processing system 702 includes processing circuitry 704 and memory device 705 that stores operating software 706. Wireless communication device 700 may include other well-known components such as a battery and enclosure that are not shown for clarity. Wireless communication device 700 may comprise a telephone, computer, e-book, mobile Internet appliance, media player, game console, wireless network interface card, or some other wireless communication apparatus—including combinations thereof.

Wireless communication interface 701 comprises RF communication circuitry and antenna interface 707. The RF communication circuitry typically includes an amplifier, filter, RF modulator, and signal processing circuitry. Wireless communication interface 701 may also include a memory device, software, processing circuitry, or some other communication device. Wireless communication interface 701 may use various protocols, such as CDMA, GSM, UMTS, HSPA, EV-DO, EV-DO rev. A, 3GPP LTE, WiMAX, Wi-Fi, Bluetooth, Internet, telephony, or some other wireless communication format. Antenna interface 707 is configured to physically connect to an antenna mounting unit.

User interface 703 comprises components that interact with a user to receive user inputs and to present media and/or information. User interface 703 may include a speaker, microphone, buttons, lights, display screen, touch screen, touch pad, scroll wheel, communication port, or some other user input/output apparatus—including combinations thereof. User interface 703 is configured to receive wireless communication usage information from a user and to display an image of a selected antenna configuration installed on an antenna mounting unit.

Processing circuitry 704 comprises microprocessor and other circuitry that retrieves and executes operating software 706 from memory device 705. Memory device 705 comprises a disk drive, flash drive, data storage circuitry, or some other memory apparatus. Processing circuitry 704 is typically mounted on a circuit board that may also hold memory device 705 and portions of communication interface 701 and user interface 703. Operating software 706 comprises computer programs, firmware, or some other form of machine-readable processing instructions. Operating software 706 may include an operating system, utilities, drivers, network interfaces, applications, or some other type of software. When executed by processing circuitry 704, operating software 706 directs processing system 702 to operate wireless communication device 700 as described herein for wireless communication devices 101, 400, 500, and 600. In particular, operating software 706 may direct processing system 702 to direct user interface 703 to receive wireless communication usage information from a user. Further, operating software 706 directs processing system 702 to process the wireless communication usage information to select one of a plurality of antenna configurations. In addition, operating software 706 may direct processing system 702 to direct user interface 703 to display an image of the selected antenna configuration installed on an antenna mounting unit.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A wireless communication device comprising:
   an antenna interface configured to physically connect to an antenna mounting unit;
   a user interface configured to receive wireless communication usage information from a user;
   a processing system configured to process the wireless communication usage information to select one of a plurality of antenna configurations; and
   the user interface configured to display an image of the selected antenna configuration of the antenna mounting unit to be installed.

2. The wireless communication device of claim 1, wherein the user interface configured to receive the wireless communication usage information from the user comprises the user interface configured to receive a selection of a plurality of radio frequency (RF) technologies from the user.

3. The wireless communication device of claim 2, wherein the user interface configured to receive the selection of the plurality of RF technologies from the user comprises the user interface configured to display the plurality of RF technologies and receive the selection of the plurality of RF technologies from the user.

4. The wireless communication device of claim 2, wherein the user interface configured to receive the selection of the plurality of RF technologies from the user comprises the user interface configured to receive a percentage of usage for each of the selected RF technologies from the user.

5. The wireless communication device of claim 1, wherein the processing system configured to process the wireless communication usage information to select the one of the plurality of antenna configurations comprises the processing system configured to match the wireless communication usage information to the selected antenna configuration.

6. The wireless communication device of claim 1, wherein the user interface configured to display the image of the selected antenna configuration comprises the user interface configured to display the image of an actual size of the selected antenna configuration of the antenna mounting unit to be installed.

7. The wireless communication device of claim 1, wherein the user interface configured to display the image of the selected antenna configuration comprises the user interface configured to display an identification code of the selected antenna configuration of the antenna mounting unit to be installed.

8. The wireless communication device of claim 1, further comprising an internal antenna and a switch between the internal antenna and the antenna interface.

9. The wireless communication device of claim 8, wherein the processing system is configured to direct the switch to deactivate the internal antenna and activate the antenna interface when the antenna mounting unit is physically connected to the antenna interface.

10. The wireless communication device of claim 1, wherein the wireless communication usage information comprises wireless communication protocols and radar detection.

11. A method of operating a wireless communication device comprising an antenna interface configured to physically connect to an antenna mounting unit, the method comprising:
   receiving wireless communication usage information from a user;
   processing the wireless communication usage information to select one of a plurality of antenna configurations; and
   displaying an image of the selected antenna configuration of the antenna mounting unit to be installed.

12. The method of claim 11, wherein receiving the wireless communication usage information from the user comprises receiving a selection of a plurality of radio frequency (RF) technologies from the user.

13. The method of claim 12, wherein receiving the selection of the plurality of RF technologies from the user comprises displaying the plurality of RF technologies and receiving the selection of the plurality of RF technologies from the user.

14. The method of claim 12, wherein receiving the selection of the plurality of RF technologies from the user comprises receiving a percentage of usage for each of the selected RF technologies from the user.

15. The method of claim 11, wherein processing the wireless communication usage information to select the one of the plurality of antenna configurations comprises matching the wireless communication usage information to the selected antenna configuration.

16. The method of claim 11, wherein displaying the image of the selected antenna configuration comprises displaying the image of an actual size of the selected antenna configuration of the antenna mounting unit to be installed.

17. The method of claim 11, wherein displaying the image of the selected antenna configuration comprises displaying an identification code of the selected antenna configuration of the antenna mounting unit to be installed.

18. The method of claim 11, wherein the wireless communication device further comprises an internal antenna and a switch between the internal antenna and the antenna interface.

19. The method of claim 18, further comprising deactivating the internal antenna and activating the antenna interface when the antenna mounting unit is physically connected to the antenna interface.

20. A wireless communication device comprising:
an antenna interface configured to physically connect to an antenna mounting unit;
a user interface configured to receive wireless communication usage information from a user, wherein the wireless communication usage information comprises a plurality of radio frequency (RF) technologies;
a processing system configured to process the wireless communication usage information to select one of a plurality of antenna configurations based on the plurality of RF technologies; and
the user interface configured to display an image of an actual size of the selected antenna configuration of the antenna mounting unit to be installed.

* * * * *